(12) United States Patent
Watanabe et al.

(10) Patent No.: US 8,308,354 B2
(45) Date of Patent: Nov. 13, 2012

(54) MECHANISM OF MONITORING UNIT OF ELECTRIC ROTATING MACHINERY AND MONITORING METHOD OF ELECTRIC ROTATING MACHINERY

(75) Inventors: Takeshi Watanabe, Tokyo (JP); Yuji Yao, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 612 days.

(21) Appl. No.: 12/444,311

(22) PCT Filed: Oct. 5, 2006

(86) PCT No.: PCT/JP2006/319951
§ 371 (c)(1),
(2), (4) Date: Jan. 12, 2010

(87) PCT Pub. No.: WO2008/044263
PCT Pub. Date: Apr. 17, 2008

(65) Prior Publication Data
US 2010/0135354 A1    Jun. 3, 2010

(51) Int. Cl.
*G01J 5/00* (2006.01)
*G01K 13/00* (2006.01)
(52) U.S. Cl. ......... 374/123; 374/121; 374/141; 374/152
(58) Field of Classification Search .................. 374/141, 374/121, 123, 152
See application file for complete search history.

(56) References Cited

U.S. PATENT DOCUMENTS
5,793,522 A     8/1998  Brun
2008/0095212 A1*  4/2008  Jonnalagadda et al. ...... 374/124
2009/0312956 A1* 12/2009  Zombo et al. ................. 702/34
2012/0140791 A1*  6/2012  Lawandy ...................... 374/45
2012/0170611 A1*  7/2012  Wang et al. ................. 374/121

FOREIGN PATENT DOCUMENTS
| JP | 58-9068 | 1/1983 |
| JP | 6-288922 | 10/1994 |
| JP | 7-198612 | 8/1995 |
| JP | 8-201361 | 8/1996 |
| JP | 2005-274520 | 10/2005 |
| JP | 2005-291711 | 10/2005 |
| JP | 2006-98270 | 4/2006 |

OTHER PUBLICATIONS

Notification of Transmittal of translation of the International Preliminary Report on Patentability dated Apr. 30, 2009 of PCT/JP2006/319951.
International Search Report for PCT/JP2006/319951 mailed by JPO on Dec. 19, 2006.

* cited by examiner

Primary Examiner — Mirellys Jagan
(74) Attorney, Agent, or Firm — Finnegan, Henderson, Farabow, Garrett & Dunner, L.L.P.

(57) ABSTRACT

A mechanism of a monitoring unit of an electric rotating machinery covered in a housing that intercepts photoelectron transmission, the mechanism has: a monitoring window penetrating a part of the housing and configured to allow passage of photoelectrons and not to allow passage of gas; a camera arranged outside the monitoring window and configured to receive radiated photoelectron generated in the housing and passing through the monitoring window and to generate image data from the radiated photoelectron; and a computing unit configured to process the image data. The computing unit has reference image data storage means for storing image data resulting from blackbody radiation occurring in a reference state in the housing, as reference image data, and temperature calculating means for comparing the image data with the reference image data, thereby to calculate the temperature in the housing.

19 Claims, 15 Drawing Sheets

MECHANISM OF MONITORING UNIT OF ELECTRIC ROTATING MACHINERY AND MONITORING METHOD OF ELECTRIC ROTATING MACHINERY

TECHNICAL FIELD

The present invention relates to mechanism and method of monitoring the temperature in the housing of electric rotating machinery, where the housing to which photoelectron is intercepted.

BACKGROUND TECHNOLOGY

Monitoring method of a temperature of winding of electric rotating machinery is evaluated from the resistance value of the winding of electric rotating machinery have hitherto known. There is a method of using the sensor as other methods, such as a temperature measuring resistor or a thermocouple, is arranged near the winding, thereby to measure the temperature.

The method of the insulation diagnosis of winding of electric rotating machinery measures the size and frequency of the partial discharge pulse generated are hitherto known. There is a method of detecting a partial discharge signal by using the static electric coupling of one specified phase and the other method is to detect a pulsating current signal by a high-frequency current transformer are known.

The method of detecting abnormal state of gas in the housing of electric rotating machinery is known. There is a method of extraction of gas in case, and measurement with macro analysis device.

The following three Patent Documents are known as disclosing spectroscopy analysis methods:
Patent Document 1: Japanese Patent Application Laid-Open Publication No. 06-288922
Patent Document 2: Japanese Patent Application Laid-Open Publication No. 07-198612
Patent Document 3: Japanese Patent Application Laid-Open Publication No. 08-201361

DISCLOSURE OF THE INVENTION

Problems to be Solved by the Invention

The method of evaluating the temperature from the resistance value of the winding can indeed evaluate the average temperature of the entire winding. However, the method cannot detect a local temperature change of the winding.

The method, in which a sensor, such as a temperature measuring resistor or a thermocouple, arranged near the winding, can detect a local temperature rise in the winding. In the method of measuring the temperature of neighborhood, abnormality in the measurement part can be detected. However other abnormalities cannot be detected by the method of measuring a part of temperature. If more temperature-measuring positions are provided, as many sensors as the positions must be provided. This will increase the cost.

The method of detecting a partial discharge signal by using the static electric coupling of one specified phase of the stator and the method of detecting a pulsating current signal by a high-frequency current transformer, it is difficult to detect it for the influence of turbulence.

The abnormal state cannot be in real-time detected by method of extraction of gas in the housing of electric rotating machinery and analysis with macro analyzer.

Furthermore, the conventional techniques need to use a sensor for detecting the temperature of electric rotating machinery, a sensor for detecting the partial discharge and a sensor for analyzing the gas in the housing.

The present invention has been made in consideration of the background technology described above. An object of the invention is to detect easily at least an abnormal temperature of electric rotating machinery.

Another object of the present invention is to detect easily the abnormality of partial discharge caused by deterioration of the insulation in electric rotating machinery, almost in real-time. A further object of the invention is to analyze easily the gas in the housing of electric rotating machinery. Still another object of the invention is to detect the above-mentioned various conditions of electric rotating machinery, by using a single device.

Means for Solving the Problems

This invention is used to solve the problem in the above-mentioned. According to an aspect of the present invention, a mechanism of monitoring in a housing of electric rotating machinery, where the housing to which photoelectron is intercepted, the mechanism comprising: a monitoring window penetrating a part of the housing and configured to allow passage of photoelectron and not to allow passage of gas; a camera arranged outside the monitoring window and configured to receive radiated photoelectron generated in the housing of electric rotating machinery and passing through the monitoring window and to generate image data from the radiated photoelectron; and a computing unit configured to process the image data, wherein the computing unit has reference image data storage means for storing image data resulting from blackbody radiation occurring in a reference state in the housing of electric rotating machinery, as reference image data, and temperature calculating means for comparing the image data with the reference image data, thereby to calculate the temperature in the housing of electric rotating machinery.

There is also provided, according to another aspect of the present invention, a monitoring method of an electric rotating machinery covered in a housing, where the housing to which photoelectron is intercepted, the method comprising: providing a monitoring window penetrating a part of the housing of electric rotating machinery and configured to allow passage of photoelectron and not to allow passage of gas; arranging a camera outside the monitoring window, the camera configured to receive radiated photoelectron generated in the housing and passing through the monitoring window and to generate image data from the radiated photoelectron; storing image data resulting from blackbody radiation occurring in a reference state in the housing of electric rotating machinery, as reference image data; and comparing the image data with the reference image data, thereby to calculate the temperature in the housing of electric rotating machinery.

EFFECT IN THE INVENTION

The present invention can easily detect at least an abnormal temperature of electric rotating machinery. Further more, if this invention is used, abnormality of partial discharge caused by deterioration of the insulation, if any, in electric rotating machinery can be easily detected almost in real time, the gas in the housing of electric rotating machinery can be easily analyzed, and the various conditions of electric rotating machinery can be detected by using a single device.

EXPLANATION OF REFERENCE SYMBOLS

Figure 1:
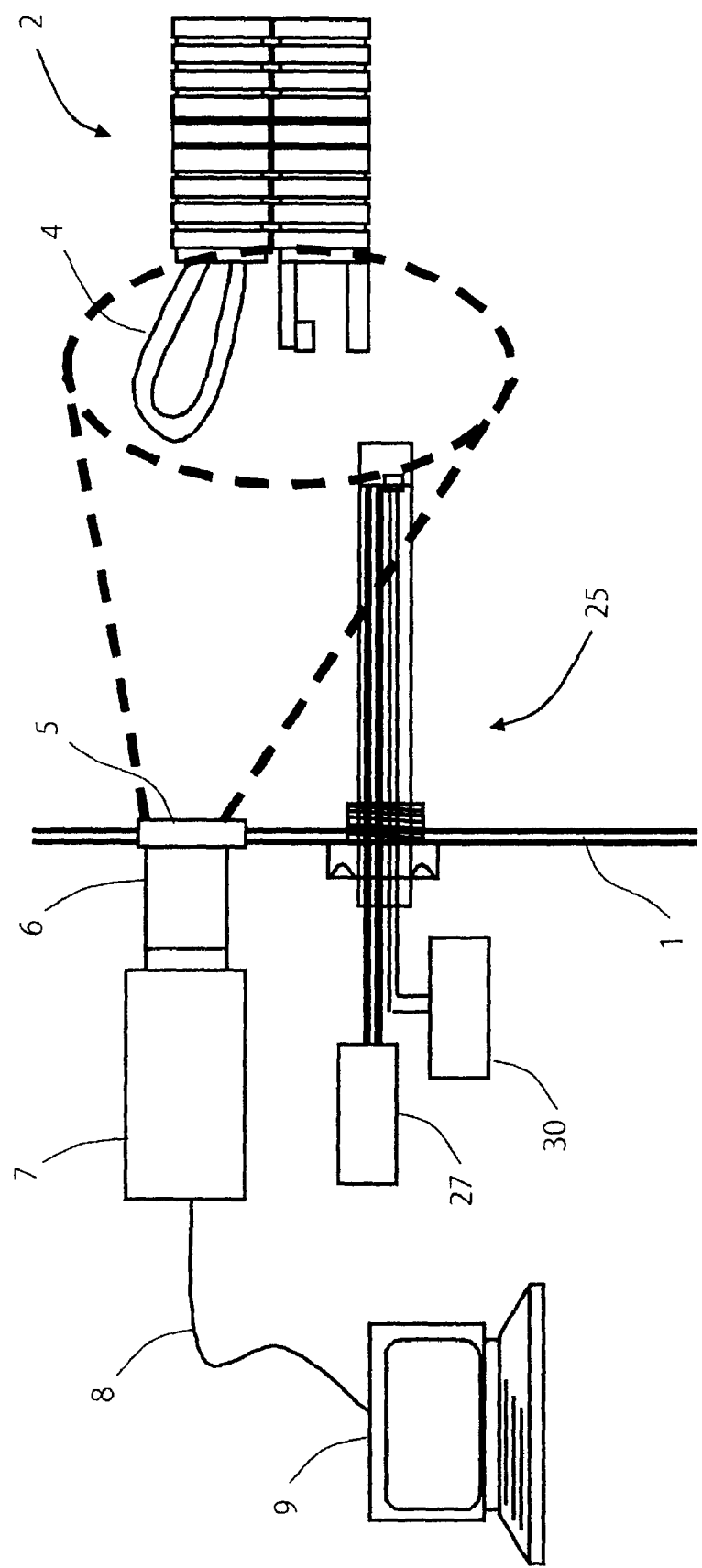
FIG. 1 is one execution chart of monitoring unit in the housing of electric rotating machinery when this invention is used; longitudinal section model chart.

1 Housing
2 Stator
4 Winding end point
5 Monitoring window
6 Photoelectron processing unit
7 Camera
7a First spectroscopy-image camera
7b Second spectroscopy-image camera
7c 2D-image camera
8 Cable
9 Computing unit
10 Photomultiplier
11 Photoelectron distributor
12 First photoelectron condenser
13 Second photoelectron condenser
14 First spectrometer
15 Second spectrometer
20 First optical path
21 Second optical path
22 Third optical path
23 First partial mirror
24 Second partial mirror
24a Opening
25 Attached heater (auxiliary-member heating unit)
26 Electric heater
27 Heater power supply
28 Heated object (auxiliary member)
29 Surface-temperature sensor
30 Surface-temperature measuring unit
50 Holder
51, 52, 53 Junction protective covers
60 Transmitter
61 Receiver
62 Transmission path
70, 71: Image data Best Mode Embodiment For Carrying Out The Invention An embodiment of mechanism of monitoring unit and monitoring method of electric rotating machinery, both according to the present invention, will be described with reference to the accompanying drawings.

Figure 2:
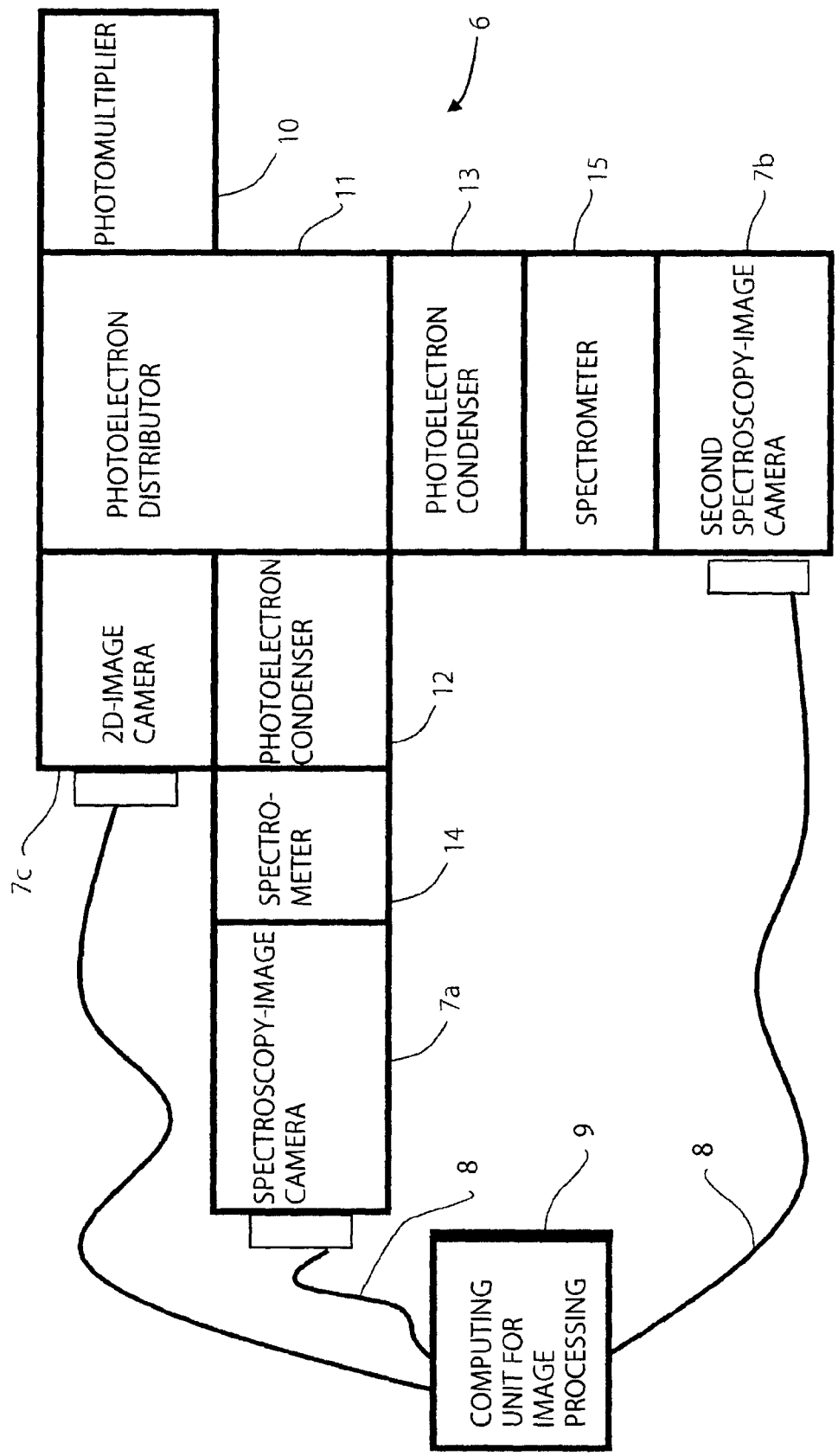
FIG. 2 is a block diagram showing the configuration of the photoelectron processing unit of the mechanism shown in FIG. 1 and the configuration of the components peripheral to the photoelectron processing unit.
Figure 3:
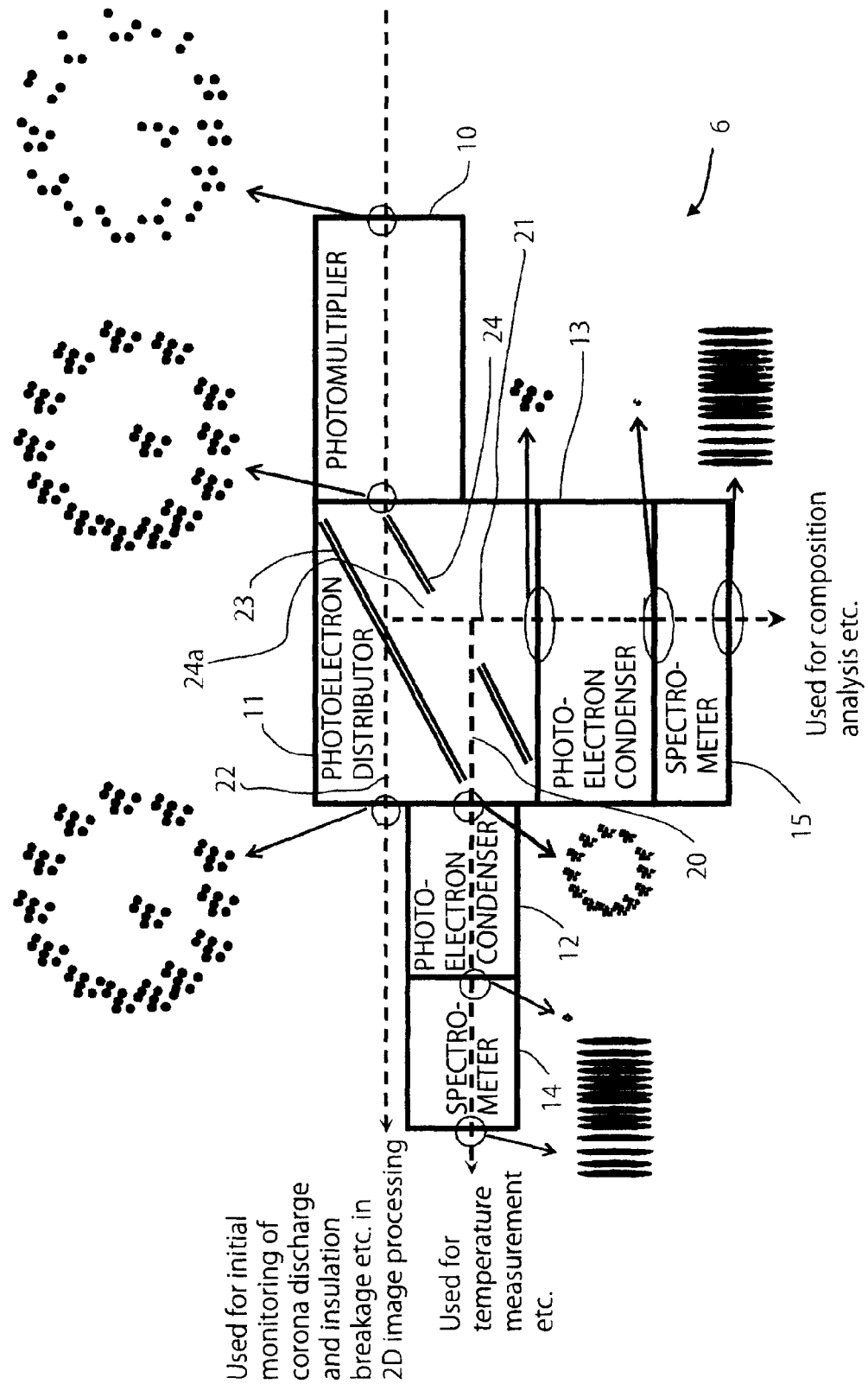
FIG. 3 is a diagram explaining the photoelectron processing unit and the image data about the components peripheral to the photoelectron processing unit.
Figure 4:
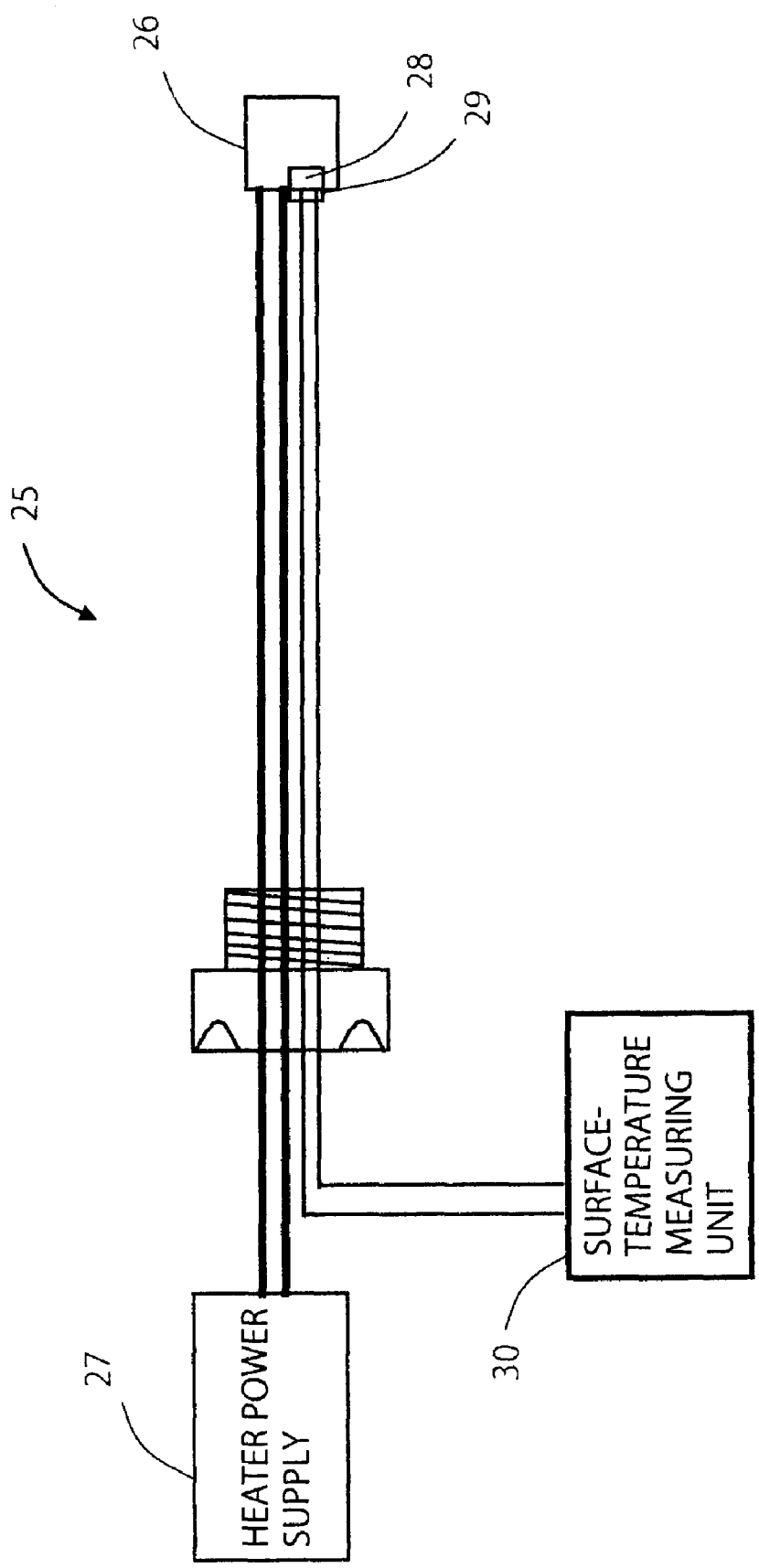
FIG. 4 is a magnified, longitudinal sectional view of the attached heater provided in the mechanism of monitoring the electric rotating machinery of FIG. 1.

An embodiment of mechanism of monitoring unit and monitoring method of electric rotating machinery, according to this embodiment, will be described with reference to FIG. 1 to FIG. 4. FIG. 1 is one execution chart of monitoring unit in the housing of electric rotating machinery when this invention is used; longitudinal section model chart. FIG. 2 is a block diagram showing the configuration of the photoelectron processing unit of the mechanism shown in FIG. 1 and the configuration of the components peripheral to the photoelectron processing unit. FIG. 3 is a diagram explaining the photoelectron processing unit and the image data about the components peripheral to the photoelectron processing unit. FIG. 4 is a magnified, longitudinal sectional view of the auxiliary-member heater (attached heater) provided in the mechanism of monitoring unit of the electric rotating machinery.

The electric rotating machinery shown in FIG. 1 is, for example, an electric motor. The electric rotating machinery comprises a housing (frame) 1 and a stator 2. The stator 2 is arranged in the housing (frame) 1. The housing 1 is made of, for example, steel, and covers the entire stator 2. The housing 1 is configured to intercept photoelectrons. The housing 1 has an opening made in a part near the winding end point 4 of the stator 2. In this opening, a monitoring window 5 is fitted, closing the opening. The monitoring window 5 is configured to allow the passage of photoelectrons, but not the passage of gas. The monitoring window 5 can remain intact even if an explosion occurs in the housing 1.

A photoelectron processing unit 6 is provided outside the monitoring window 5. The photoelectron processing unit 6 generates information, which is input to a camera 7. The camera 7 generates image data. The image data is supplied from the camera 7, in the form of a signal, through a cable 8 to a computing unit 9. The computing unit 9 processes the signal.

As shown in FIG. 2 and FIG. 3, the photoelectron processing unit 6 has a photomultiplier 10, a first optical path 20 and a photoelectron distributor 11. The photomultiplier 10 generates more photoelectrons than the photoelectrons it has received. The photoelectron distributor 11 receives photoelectrons from the photomultiplier 10 and distributes the electrons to a first optical path 20, a second optical path 21 and a third optical path 22. The photoelectron processing unit 6 further has a first photoelectron condenser 12, a second photoelectron condenser 13, a first spectrometer 14, and a second spectrometer 15. The first photoelectron condenser 12 condenses the photoelectrons coming through the first optical path 20. The second photoelectron condenser 13 condenses the photoelectrons coming through the second optical path 21. The first spectrometer 14 receives photoelectrons from the first photoelectron condenser 12 and splits the photoelectrons into beams of different wavelengths. The second spectrometer 15 receives photoelectrons from the second photoelectron condenser 13 and splits the photoelectrons into beams of different wavelengths.

The two photoelectron beams emerging from the first spectrometer 14 and second spectrometer 15, respectively, are applied to a first spectroscopy-image camera 7a and a second spectroscopy-image camera 7b, respectively. The first spectroscopy-image camera 7a generates image data, and the second spectrometer 7b generates image data. The photoelectron beam emerging from the photoelectron distributor 11 to the third optical path 22 is applied to a 2D-image camera 7c, which generates image data. In FIG. 1, the cameras 7a and 7b are illustrated as one camera 7.

The photoelectron distributor 11 is configured to distribute photoelectrons. The photoelectron distributor 11 incorporates a first partial mirror (half mirror) 23 and a second partial mirror 24. The first partial mirror 23 is semitransparent (translucent) in its entirety, allowing passage of a part (not necessarily, exactly a half) of the incident photoelectrons and not allowing the passage of the remaining part of the incident photoelectrons. That part of the photoelectrons, which have passed through the first partial mirror 23, enter the third optical path 22. The remaining part of the photoelectrons are reflected by the first partial mirror 23, are applied to the second partial mirror 24. The second partial mirror 24 has an opening 24a in the center part. A part of the photoelectrons applied to the second partial mirror 24 pass through the opening 24a and then enter the second optical path 21. The other part of the photoelectrons, which are applied to the peripheral part of the second partial mirror 24, are reflected by the second partial mirror 24 and travel through the first optical path 20.

As shown in FIG. 1, the electric rotating machinery further has an attached heater 25. The attached heater 25 penetrates the housing 1, secured to that part thereof which is near the monitoring window 5.

As shown in FIG. 4, the attached heater 25 has an electric heater 26, a heater power supply 27, a heated object 28, a surface-temperature sensor 29, and a surface-temperature measuring unit 30. The heater power supply 27 supplies electric power to the electric heater 26. The electric heater 26 heats the heated object (auxiliary member) 28. The surface-temperature sensor 29 is designed to detect the surface temperature of the heated object 28. The heated object 28 is made of metal such as copper or aluminum. As FIG. 1 shows, the heated object 28 is so located that the camera 7 may photograph it through the monitoring window 5.

The mechanism of the monitoring unit of the electric rotating machinery, which is so configured as described above, operates as will be described below.

It will be first explained how the mechanism operates while the attached heater 25 remains not driven. This is the case where the heater power supply 27 does not operate at all, or where the attached heater 25 is not provided at all.

Generally, the radiant light (i.e., electromagnetic wave) radiated from an object has an intensity that is a function of the surface temperature of the object. Hence, the temperature of the object can be estimated if the intensities of light beams emitting from various points in the surface of the object are compared with the intensities of light beams emitting from those points while the object has a reference temperature. The word "light" used here means not only visible light, but also electromagnetic waves such as infrared rays and ultraviolet rays.

Partial discharge may occur due to insufficient insulation of the stator winding of the electric rotating machinery. The partial discharge results in electromagnetic waves. Therefore, abnormality of partial discharge, if any, in electric rotating machinery can be detected from the electromagnetic waves generated in the electric rotating machinery.

Using this principle, in this embodiment, the electromagnetic waves emitting from the electric rotating machinery is detected, and the temperatures of various components are determined from the electromagnetic waves, thereby detecting the abnormality of partial discharge.

Figure 5:
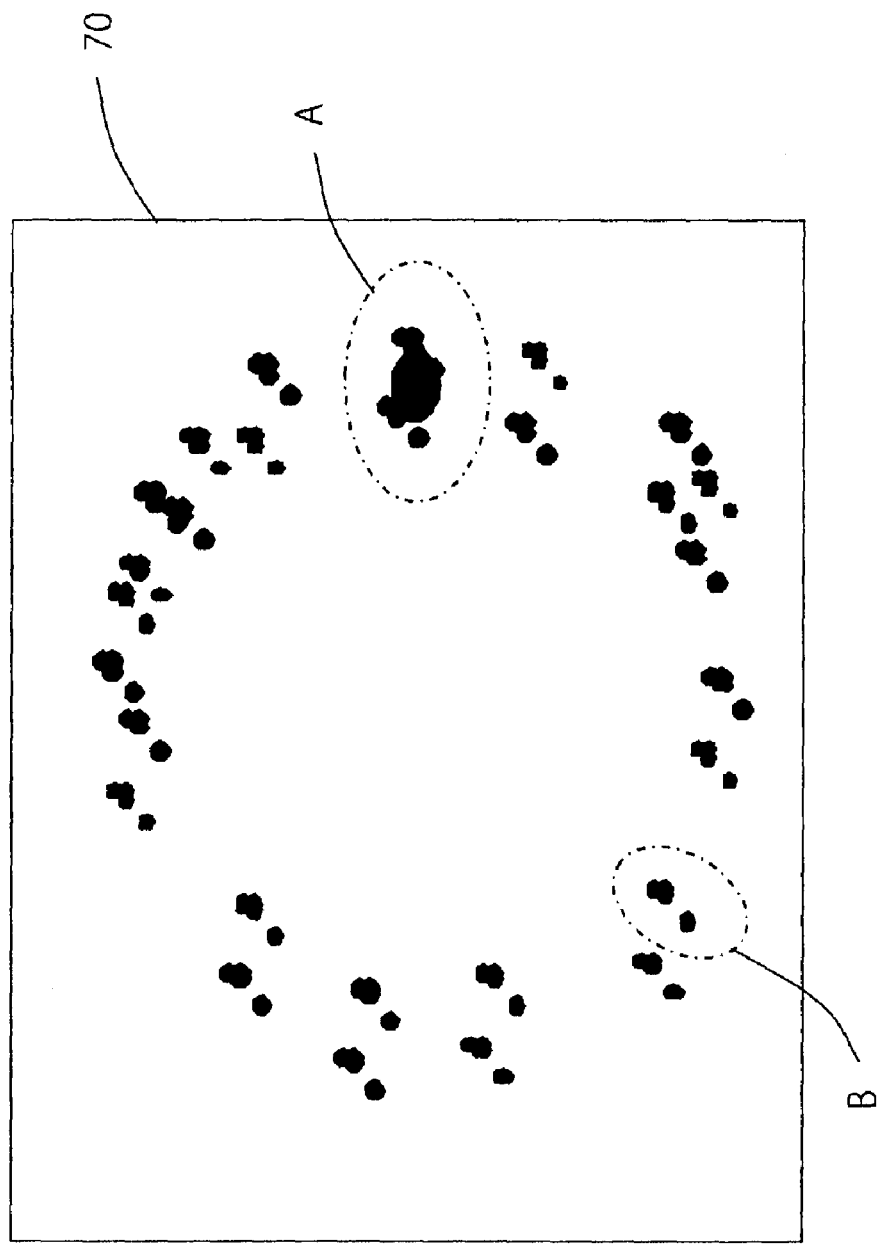
FIG. 5 is a diagram representing the two-dimensional distribution of incident photoelectron, which is observed while an object (auxiliary member) remains not heated in the mechanism of FIG. 1.

Assume that the camera 7 photographs the blackbody radiation from the winding end point 4 of the stator 2 of the electric rotating machinery, through the monitoring window 5 in the axial direction of the stator 2. Then, such image data 70 as shown in FIG. 5 are obtained. The radiation from the high-temperature part of the winding end point 4 of the stator 2 is intense. This means that the high-temperature part of the winding end point 4 is radiating intense light. From the image, which part of the electric rotating machinery emits intense light can therefore be determined. That part of the image, which is specified by an ellipse "A", emits an electromagnetic wave far stronger than the wave emitting from the other winding end point of the stator. This shows that corona discharge may be taking place at the high-temperature part, due to insufficient insulation at that part. Thus, such abnormality can be easily determined by comparing the image data with the reference image data acquired in normal state and saved in a storage device. The image data is acquired through the third optical path 22 shown in FIG. 3.

Of the image data 70 shown in FIG. 5, the part specified by an ellipse "B", for example, are supposed to radiate an intense electromagnetic wave and therefore to have high temperature. The temperature of this part is determined from the intensity of the electromagnetic wave. In this case, the light traveling through the first optical path 20 is condensed by the first photoelectron condenser 12, and the first spectrometer 14 splits the light into electromagnetic wave components of different wavelengths. One or some of these wave components are selected. Preferably, the selected wave or each selected wave component is compared with the reference wave component of the same wavelength, which has been generated at a reference temperature.

Figure 6:
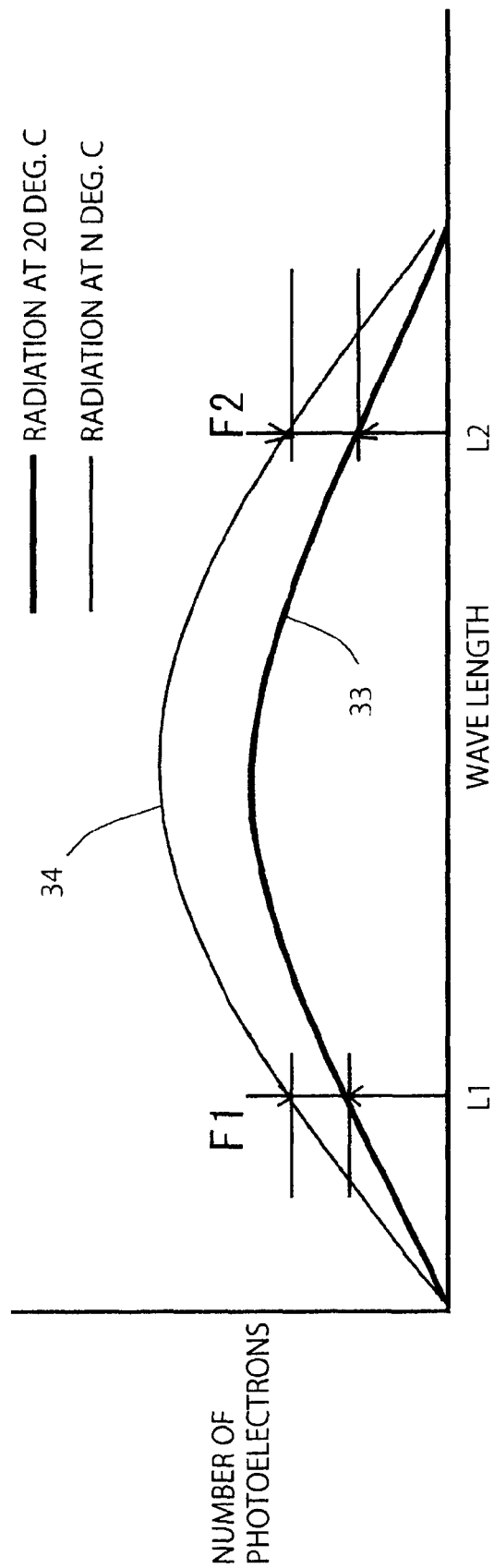
FIG. 6 is a graph representing the relation between the wavelength and the number of photoelectrons, which relation is observed in the embodiment of the mechanism according to the invention.

FIG. 6 shows a wavelength distribution curve 33 for the number of photoelectrons generated through radiation at the reference temperature of, for example, 20 degrees centigrade, and a wavelength distribution 34 for the number of photoelectrons generated through radiation at the temperature N degrees centigrade measured. If N>20, more photoelectrons are generated through the radiation at the temperature N degrees centigrade than through the radiation at the reference temperature (20 degrees centigrade), as seen from FIG. 6. Let F1 denote a difference in terms of the number of photoelectrons, for a wavelength L1, and F2 denote a difference in terms of the number of photoelectrons, for another wavelength L2. F1 and F2 have positive values if the temperature N degrees centigrade is higher than the reference temperature.

Figure 7:
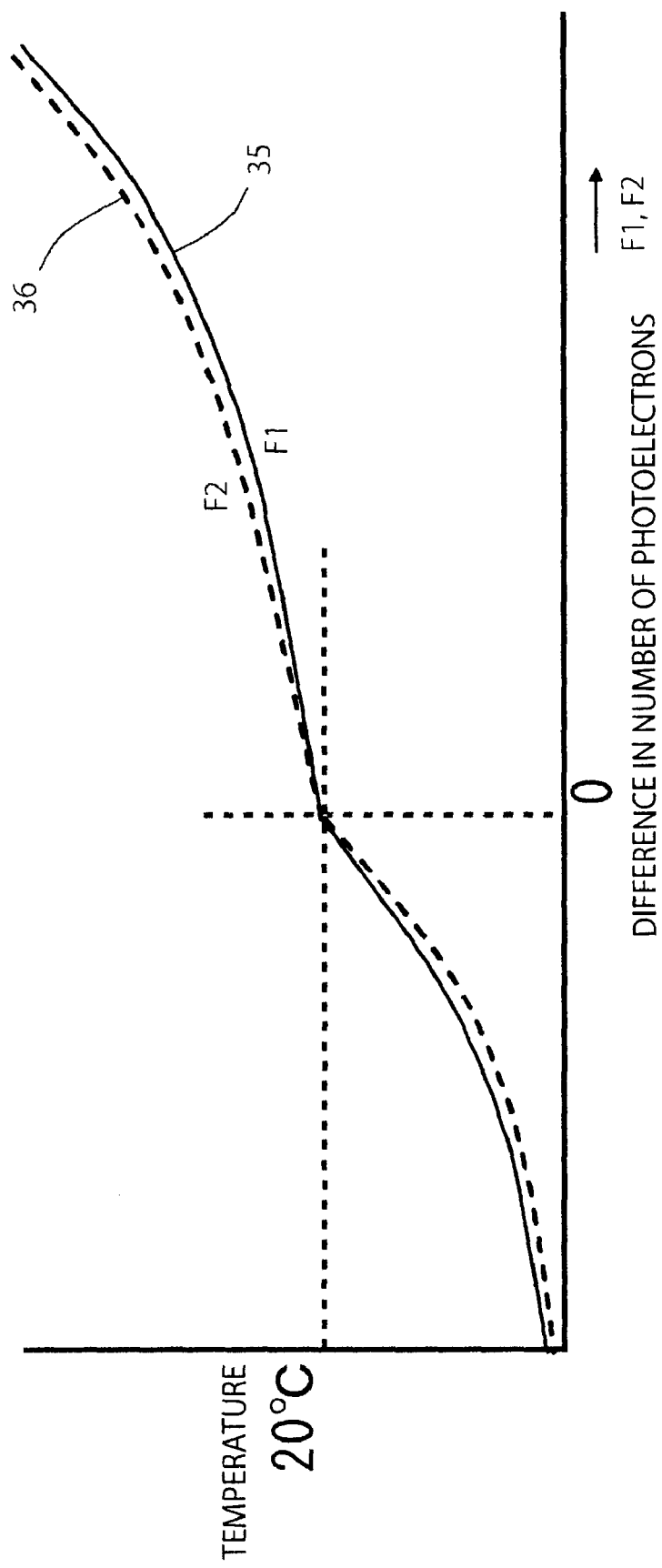
FIG. 7 is a graph representing the relation between the temperature and the difference between the number of photoelectrons existing at the temperature and the number of photoelectrons existing at a reference temperature, which relation is observed in the embodiment of the mechanism according to the invention.

The relation between the difference F1 for wavelength L1 and the difference between the measured temperature and the reference temperature can be illustrated as, for example, the solid line 35 shown in FIG. 7. Similarly, the relation between the difference F2 for wavelength L2 and the difference between the measured temperature and the reference temperature can be illustrated as, for example, the broken line 36 shown in FIG. 7. As seen from the solid line 35 and the broken line 36, the difference of both the number of photoelectrons at the reference temperature (20 degrees centigrade) are, of course, zero.

At the reference temperature and various temperatures measured, respectively, the numbers of photoelectrons resulting from the radiation can be measured, preparing both FIG. 6 and FIG. 7, and the data representing FIGS. 6 and 7 may be stored in the storage device. When the temperature of the electric rotating machinery is measured actually, the number of photoelectrons may be first determined and the temperature may then be estimated from the number of photoelectrons, based on the relations shown in FIG. 7. In this case, the temperature can indeed be estimated from the number of photoelectrons for one wavelength. Instead, the temperatures may first be estimated from the data items about various wavelengths and the temperatures thus estimated may then be compared, thereby making the data more reliable. Alternatively, the temperatures estimated from the data items may be averaged, thereby rendering the data more reliable.

How the attached heater (auxiliary-member heating unit) 25 operates in the mechanism of monitoring the electric rotating machinery will be explained. The attached heater 25 cooperates with some other components of the mechanism, such as the photoelectron processing unit 6 and the camera 7, to detect the abnormal gas generation in the housing 1 of the electric rotating machinery and to determine the concentration of the gas generated in the housing 1.

The heated object (auxiliary member) 28 is attached to the electric heater 26 inserted in the housing 1. The heater power supply 27 supplies power to the electric heater 26 on and off, whereby the heated object 28 is alternately heated and cooled, repeatedly. While the heated object 28 is being cooled, the gas in the housing 1 is applied to the surface of the heated object 28, forming a layer of gas material. When the heated object 28 is then heated, the gas-material layer is gasified. At this point, an electromagnetic wave emits from the heated object 28. This electromagnetic wave is analyzed, detecting the composition and concentration of the gas in the housing 1.

Figure 8:
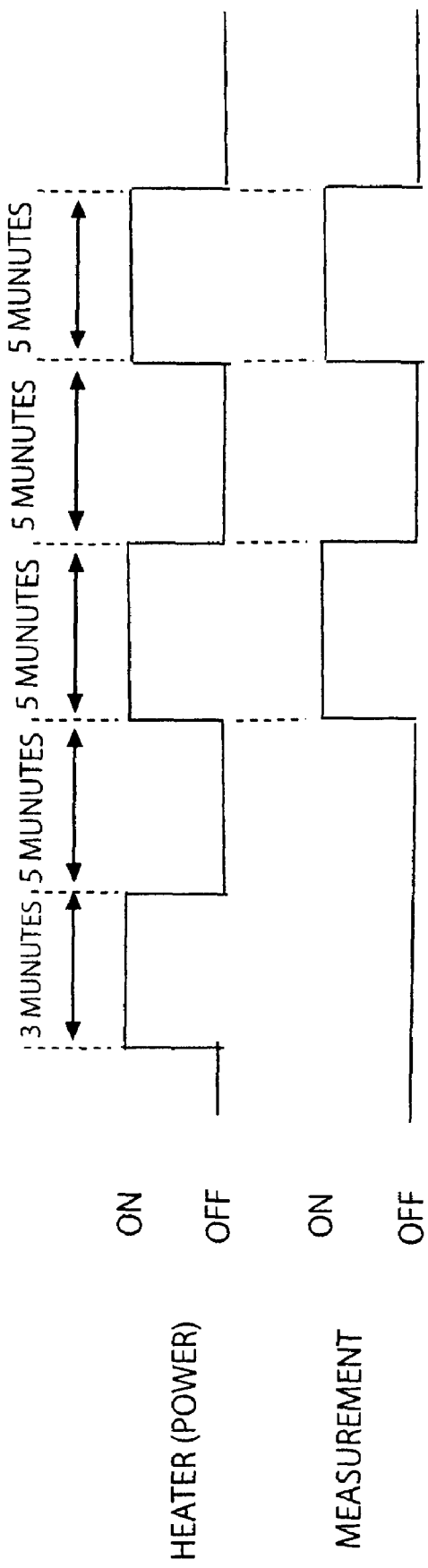
FIG. 8 is a timing chart explaining how the attached heater is intermittently driven in the embodiment of the mechanism shown in FIG. 1.

FIG. 8 is a timing chart explaining how the attached heater 25 is intermittently driven in an example of the measuring step. As shown in FIG. 8, the heated object 28 is repeatedly heated on and off, each time for 10 minutes, heated for five minutes and then cooled for five minutes. While the heated object 28 is being heated, data about photoelectrons is acquired.

Figure 9:
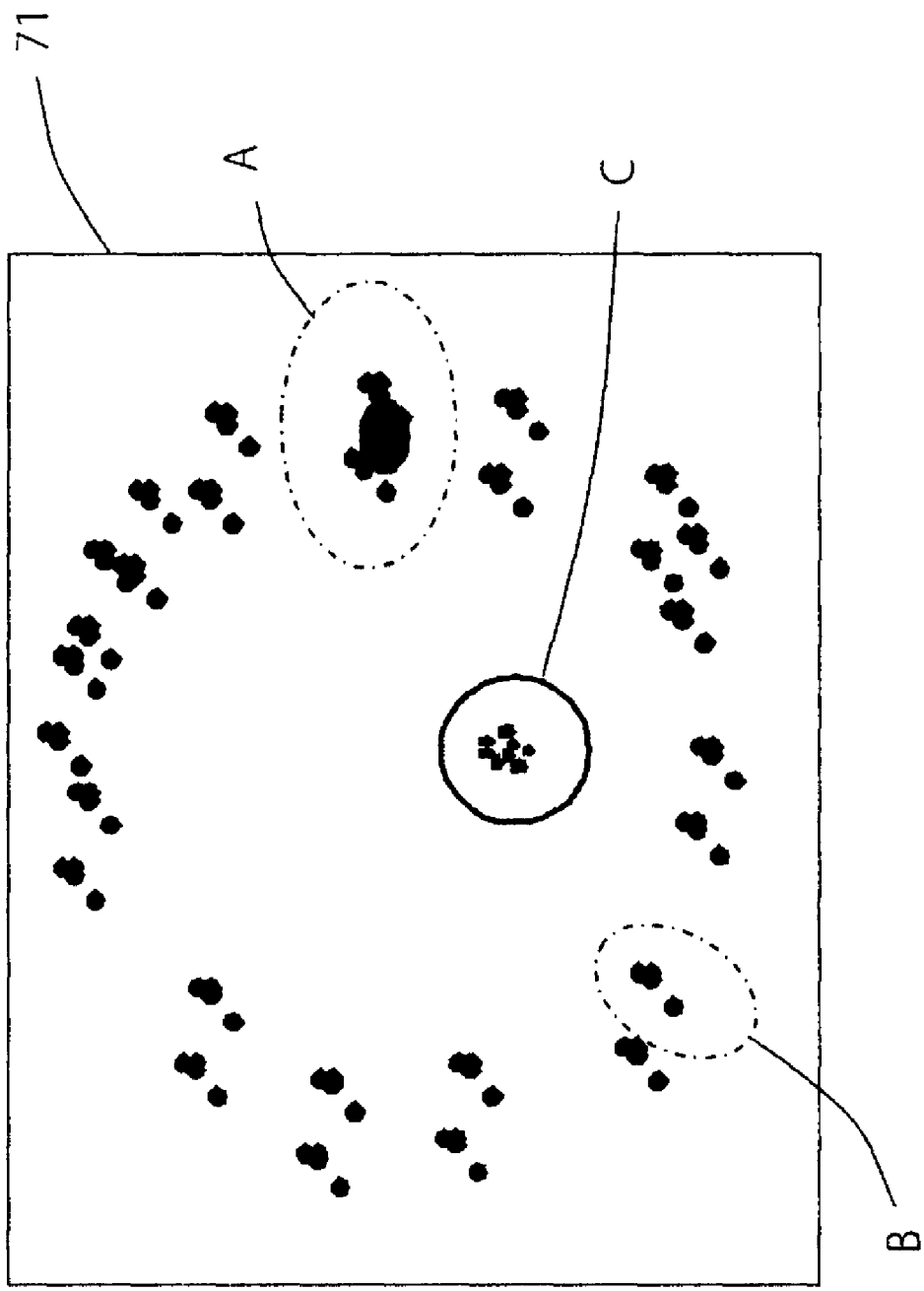
FIG. 9 is a diagram representing the two-dimensional distribution of incident photoelectron to the photoelectron processing unit, which is observed while the object remains heated in the mechanism of FIG. 1.

FIG. 9 is a diagram showing image data 71 of photoelectrons input to the photoelectron processing unit 6 every time the heated object 28 is heated on as shown in FIG. 8. In FIG. 9, ellipse B specifies a part that emits an electromagnetic wave corresponding to the heat emitting from the winding end point 4 of the stator 2 of the electric rotating machinery, and ellipse A specifies a part that emits an electromagnetic wave due to abnormal discharge, as in the case of FIG. 5. In FIG. 9, ellipse "C" specifies a part that emits an electromagnetic wave, too. This part radiates an electromagnetic wave that corresponds to the heat radiating from the heated object 28.

Figure 10:
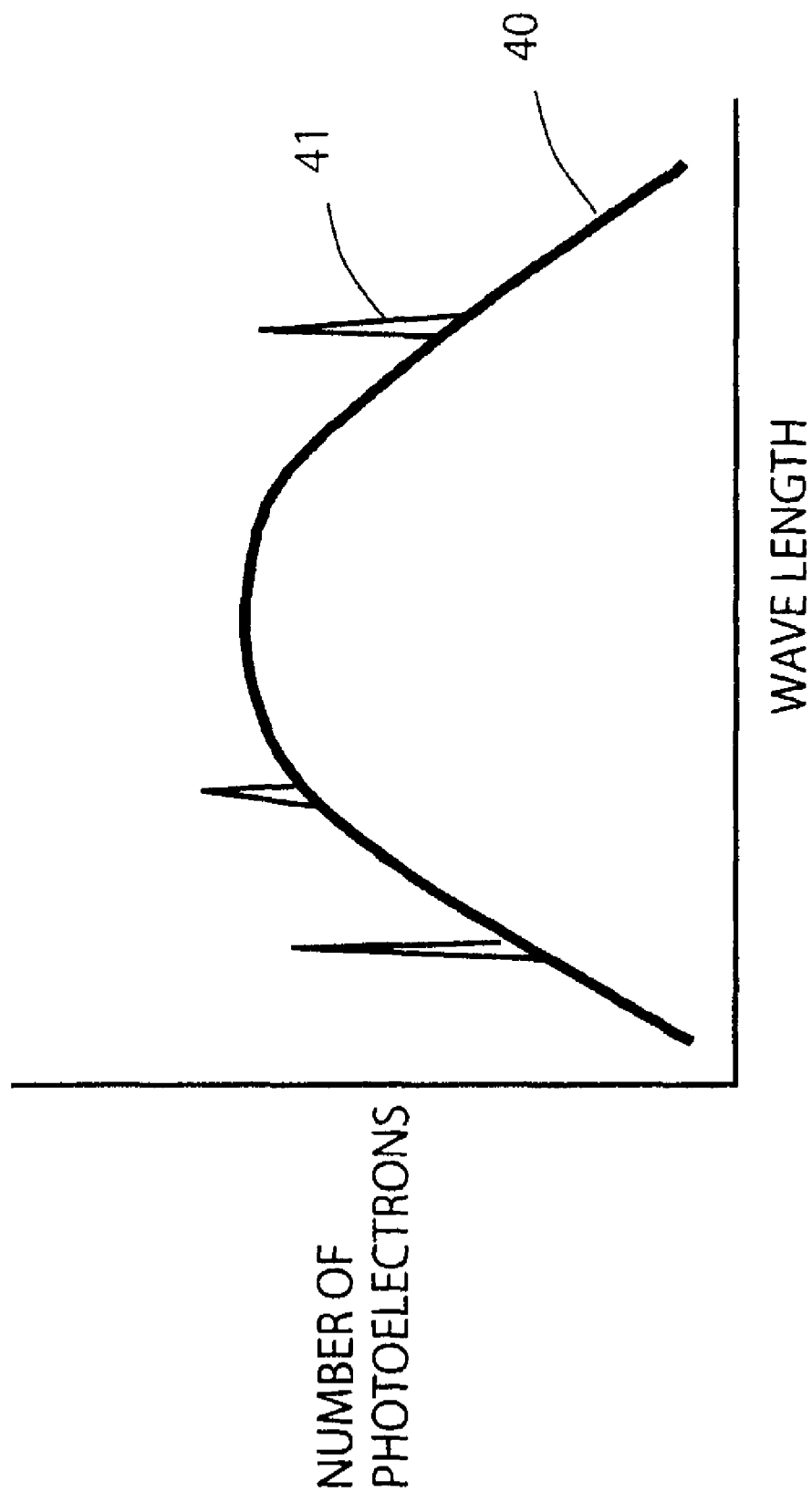
FIG. 10 is a graph representing the relation between the number of photoelectrons generated from the photoelectron emitting from the heated object of FIG. 9 and the wavelength.

FIG. 10 is a graph representing the relation between the number of photoelectrons and the wavelength, both pertaining to the electromagnetic wave emitting from part C in FIG. 9, i.e., heated object 28. This distribution curve consists of a distribution curve 40 that is as gentle as the distribution curve shown in FIG. 6, and a peaks 14 at some wavelengths. The gentle distribution curve 40 is a distribution curve for a specific temperature, or similar to the curves shown in FIG. 6.

On the other hand, the peaks 41 result from the radiations that correspond to the materials attached to, heated on and emitted from the surface of the heated object 28. The wavelengths at which the peaks 41 are observed (i.e., specific leak wavelengths) pertain to the kinds of gases. Hence, the gases can be identified with the wavelengths at which the peaks 41 are observed.

The heights of the peaks 41 may be measured. From the heights of peaks 41, the concentrations of gas components in the housing 1 can be determined.

Figure 11:
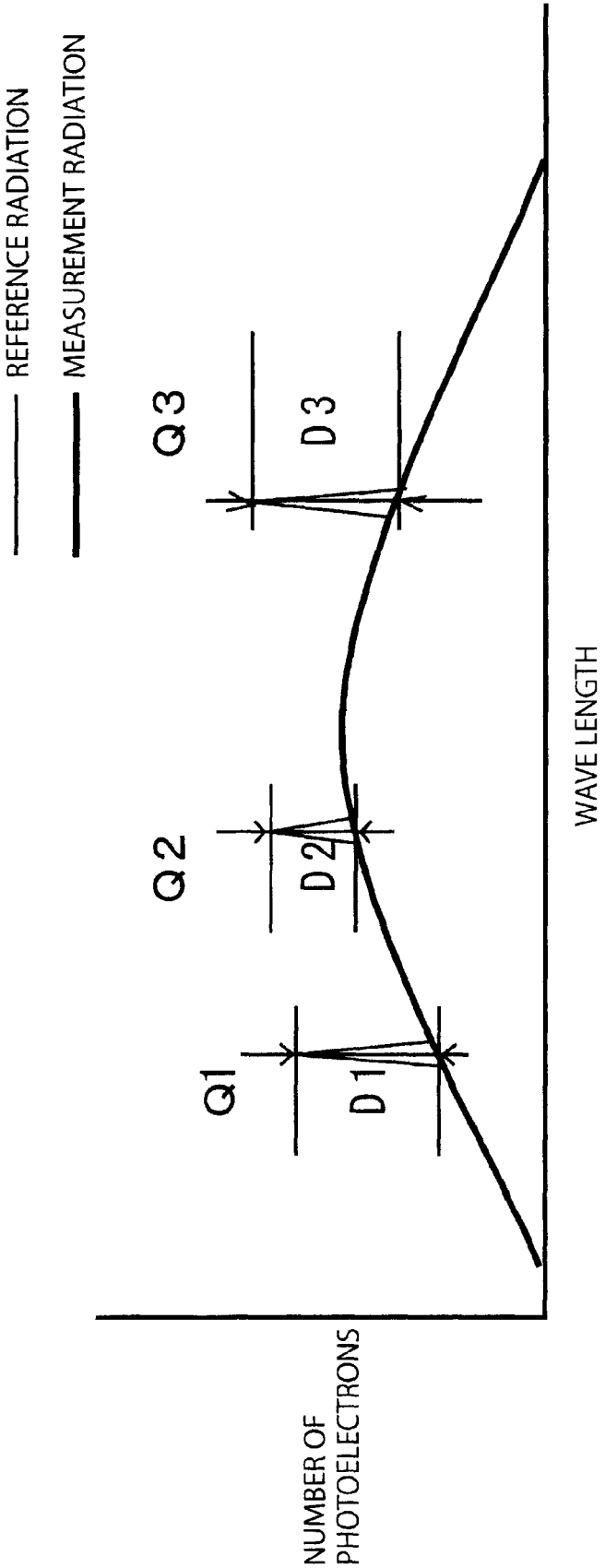
FIG. 11 is a graph representing the difference between the data shown in FIG. 10 with the data inherent to the reference temperature, in terms of the number of photoelectrons and wavelength.
Figure 12:
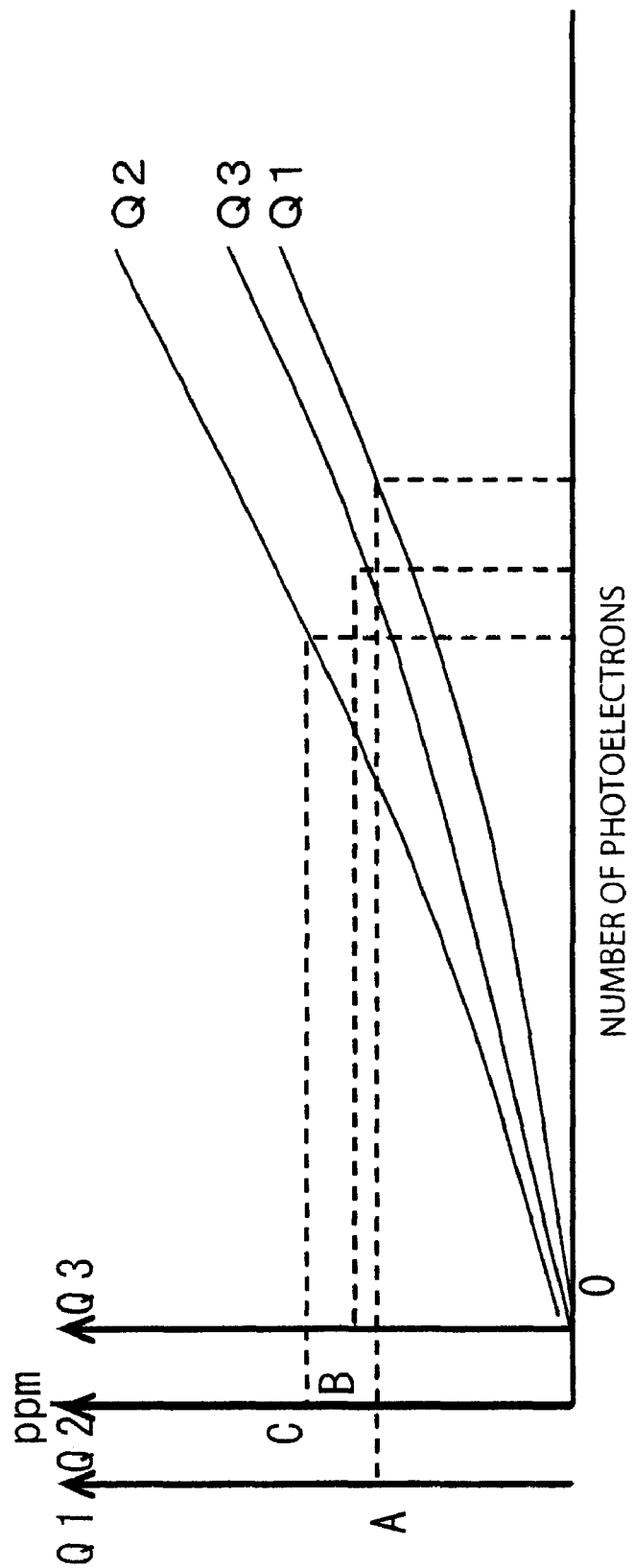
FIG. 12 is a graph representing the relation between the gas concentration and the number of photoelectrons, which is used to determine the gas concentration based on the data shown in FIG. 11.

FIG. 11 is a graph showing the difference between the data shown in FIG. 10 with the data inherent to the reference temperature, in terms of the number of photoelectrons and wavelength. In the case shown in FIG. 11, the number of photoelectrons sharply increases at three wavelengths Q1, Q2 and Q3. This graph may be compared with the data specific to the reference temperature, thereby to determine the numbers D1, D2 and D3 of photoelectrons which are specific to wavelengths Q1, Q2 and Q3, respectively. Increases in the photoelectrons which are specific to various known gas concentrations corresponding to wavelengths Q1, Q2 and Q3 are then measured, and such relations between the gas concentrations and the photoelectron numbers as shown in FIG. 12 (i.e., calibration curves) are obtained to store the data. Then, the number of photoelectrons actually resulting from the electromagnetic wave generated in the electric rotating machinery is measured and compared with each of the calibration curves. Thus, the number of photoelectrons can be converted to the gas concentration that corresponds to a specific wavelength.

In the configuration described above, the electric heater 26 and the heated object 28 are two different members. Nonetheless, the heated object 28 may be an electrical resistor. If this is the case, the electric heater 26 and the heated object 28 can be integrated into one member.

If an abnormal temperature of the electric rotating machinery, abnormal discharge, or abnormal as generation in the housing is detected as described above, an alarm may be generated.

Figure 13:
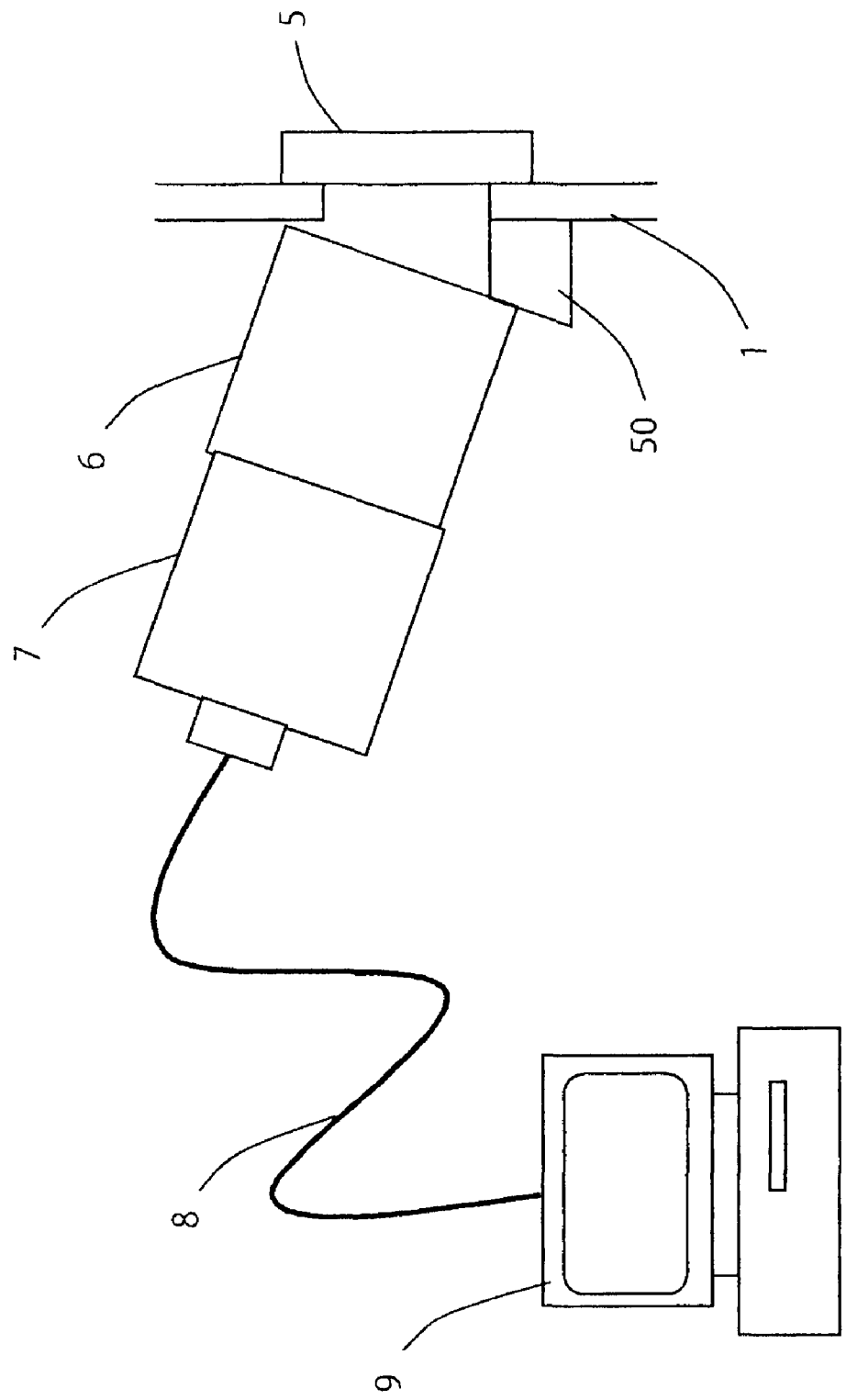
FIG. 13 is a schematic longitudinal sectional view illustrating another positional relation that the monitoring window, photoelectron processing unit and camera have in the mechanism of FIG. 1.
Figure 14:
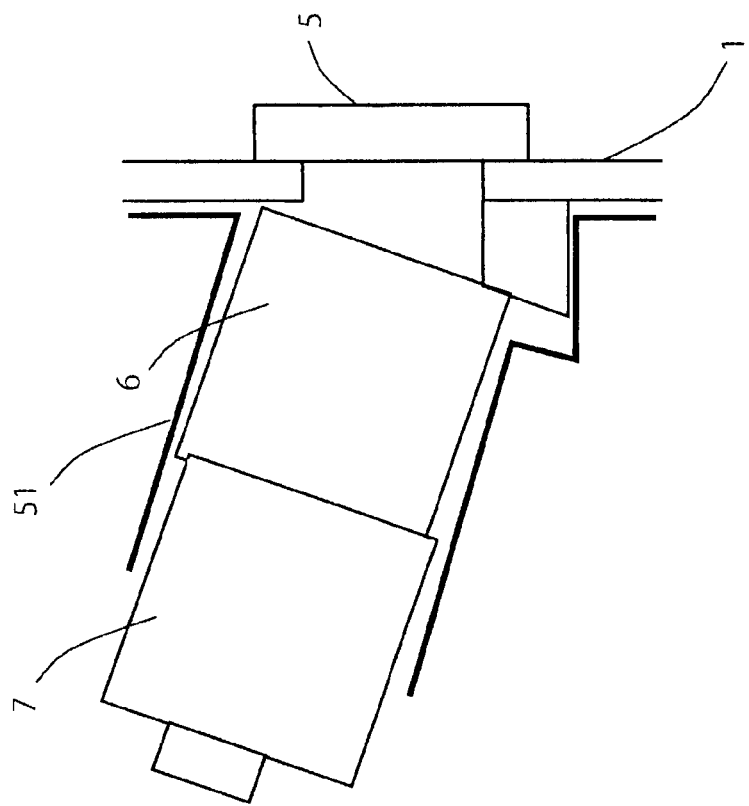
FIG. 14 is a schematic longitudinal sectional view showing a protective cover secured to the junction between the monitoring window, photoelectron processing unit and camera, all shown in FIG. 13.
Figure 15:
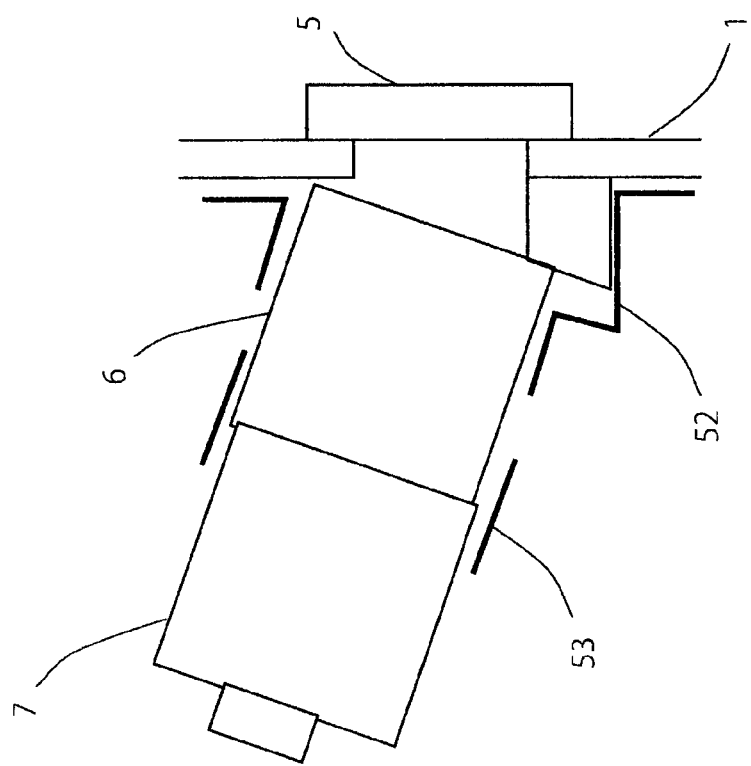
FIG. 15 is a schematic longitudinal sectional view showing a protective cover which is different from the cover shown in FIG. 14 and which is secured to the junction between the monitoring window, photoelectron processing unit and camera, all shown in FIG. 14.

FIG. 13 illustrates a modification of the configuration for securing the photoelectron processing unit 6 to the monitoring window 5 in the mechanism of the monitoring unit of the electric rotating machinery, which is shown in FIG. 1. As shown in FIG. 13, the photoelectron processing unit 6 is obliquely secured to the monitoring window 5. In this case, a holder 50 is attached to the housing 1 or the monitoring window 5, preventing photoelectrons from leaking at the junction between the unit 6 and the window 5. In the case of FIG. 14, not only the photoelectron processing unit 6 is obliquely secured to the monitoring window 5, but also a junction protective cover 51 surrounds the junction between the window 5 and the unit 6 and the junction between the unit 6 and the camera 7. FIG. 15 shows a modification of the configuration of FIG. 14. As FIG. 15 shows, two junction protective covers 52 and 53 are used. The cover 52 covers the junction between the monitoring window 5 and the photoelectron processing unit 6, while the cover 53 covers the junction between the photoelectron processing unit 6 and the camera 7. Still another modification is to fill the gap with putty or to solder the junction, instead of using a junction protective cover or covers.

Figure 16:
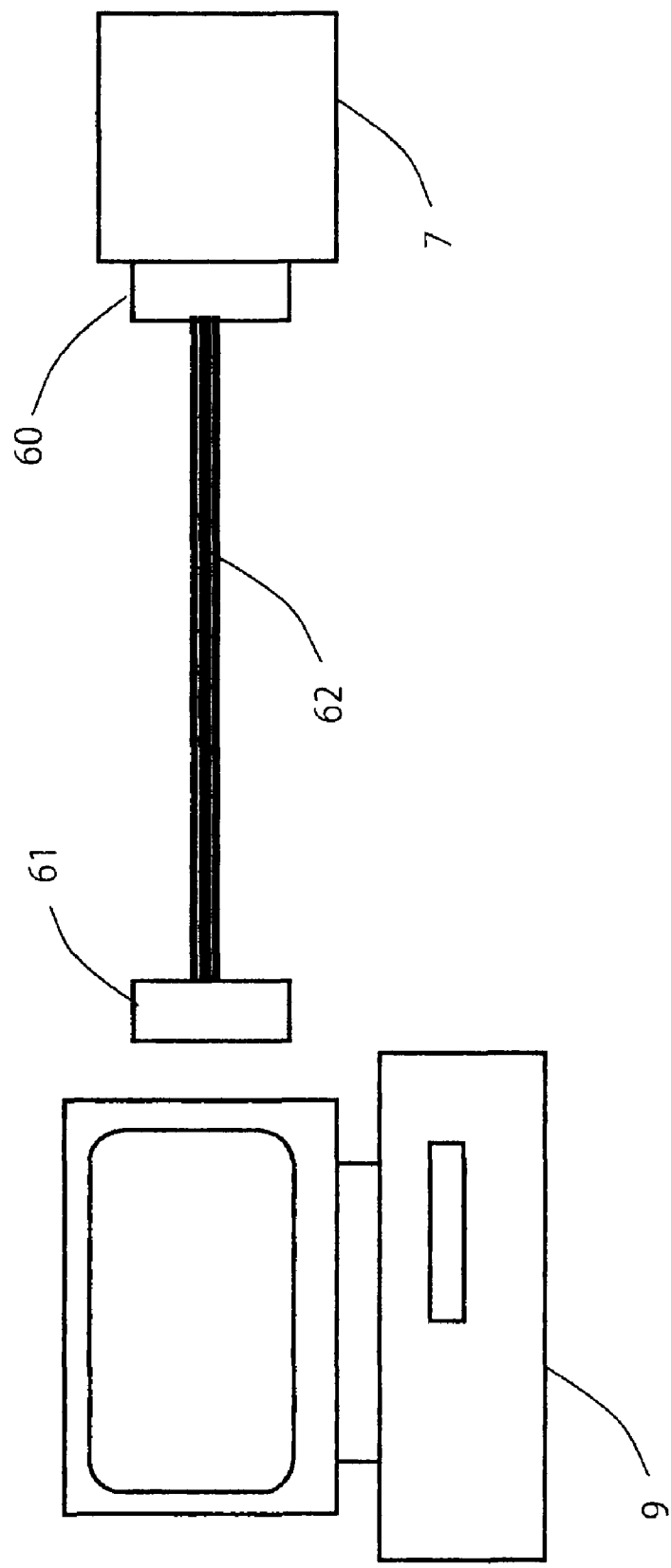
FIG. 16 is a schematic longitudinal sectional view showing how the camera and the computing unit are connected in a modification of the mechanism shown in FIG. 1.

FIG. 16 shows a signal path extending between the camera 7 and the computing unit 9, which differs from those shown in FIG. 1 and FIG. 13. In this instance, a transmitter 60 and a receiver 61 are arranged at the camera 7 and the computing unit 9, respectively, and a transmission path 62 connects the transmitter 60 and the receiver 61. The transmission path 62 may be replaced by radio transmission.

The invention claimed is:

1. A mechanism of monitoring a unit of an electric rotating machinery in a housing from which photoelectrons are intercepted by a camera, the mechanism comprising:
    a monitoring window penetrating a part of the housing and configured to allow passage of the photoelectrons and not to allow passage of gas;
    a camera arranged outside of the monitoring window and configured to receive the radiated photoelectrons generated in the housing of the electric rotating machinery and passing through the monitoring window, and to generate image data from the radiated photoelectrons; and
    a computing unit configured to process the image data, wherein
    the computing unit has reference image data storage means for storing the image data resulting from blackbody radiation occurring in a reference state in the housing of the electric rotating machinery as reference image data, and temperature calculating means for comparing the image data with the reference image data, thereby to calculate the temperature in the housing of the electric rotating machinery.

2. The mechanism of the monitoring unit of the electric rotating machinery according to claim 1, further comprising a photomultiplier configured to convert the radiated light coming through the monitoring window to photoelectrons, thereby multiplying the photoelectrons, and to apply the photoelectrons to the camera.

3. The mechanism of the monitoring unit of the electric rotating machinery according to claim 1, wherein the computing unit includes means for comparing the image data with the reference image data, thereby to determine generation of an abnormal electromagnetic wave in the housing and determine the position where the abnormal electromagnetic wave is generated.

4. The mechanism of the monitoring unit of the electric rotating machinery according to claim 1, wherein a cable connects the camera and the computing unit.

5. The mechanism of the monitoring unit of the electric rotating machinery according to claim 1, wherein a transmitter is attached to the camera in order to transmit the image data, and a receiver is attached to the computing unit in order to receive the image data transmitted from the camera.

6. The mechanism of the monitoring unit of the electric rotating machinery according to claim 1, further comprising a protective cover configured to suppress entry of photoelectrons to a gap between the monitoring window and the camera.

7. The mechanism of the monitoring unit of the electric rotating machinery according to claim 1, wherein the computing unit further has an alarm device configured to generate an alarm when the image data differs from the reference image data by a value greater than a prescribed width.

8. The mechanism of the monitoring unit of the electric rotating machinery according to claim 1, further comprising a spectrometer for splitting the radiated photoelectrons coming through the monitoring window into photoelectron beams of different wavelengths, wherein
    the temperature calculating means compares the image data with the reference image data with respect to at least one beam of a specific wavelength, thereby to calculate the temperature in the housing.

9. The mechanism of the monitoring unit of the electric rotating machinery according to claim 8, wherein the temperature calculating means compares the image data with the reference image data with respect to at least two beams of specific wavelengths, thereby to calculate temperatures in the housing, and includes a means for finding an average of the temperatures calculated.

10. The mechanism of the monitoring unit of the electric rotating machinery according to claim 1, further comprising:
    a heated object arranged in the housing and at a position to be heated and monitored through the monitoring window by the camera;
    a heater configured to heat the heated object; and
    a thermometer configured to measure the temperature of the heated object thus heated, wherein
    the computing unit further includes specific wavelength-peak extracting means for comparing the wavelength distribution of the image data acquired when the heater heats the heated object, evaporating a material sticking to the heated object, with the wavelength distribution of the reference image data, thereby to extract specific peak wavelengths.

11. The mechanism of the monitoring unit of the electric rotating machinery, according to claim 10, wherein the computing unit includes means for determining the composition of the gas in the housing from the specific peak wavelengths.

12. The mechanism of the monitoring unit of the electric rotating machinery according to claim 11, wherein the computing unit further includes means for determining the concentration of a specific gas component in the housing from the intensities of radiated photoelectron beams of the specific peak wavelengths of the image data.

13. A monitoring method of an electric rotating machinery covered in a housing from which photoelectrons are intercepted, the method comprising:
    providing a monitoring window penetrating a part of the housing of the electric rotating machinery and configured to allow passage of photoelectrons and not to allow passage of gas;
    arranging a camera outside of the monitoring window, the camera configured to receive radiated photoelectrons generated in the housing and passing through the monitoring window, and to generate image data from the radiated photoelectrons;
    storing image data resulting from blackbody radiation occurring in a reference state in the housing of the electric rotating machinery as reference image data; and
    comparing the image data with the reference image data, thereby to calculate the temperature in the housing of the electric rotating machinery.

14. The method of monitoring electric rotating machinery according to claim 13, wherein a photomultiplier converts the radiated light coming through the monitoring window to photoelectrons, thereby multiplying the light, and applies the photoelectrons to the camera.

15. The method of monitoring electric rotating machinery according to claim 13, wherein the image data is compared with the reference image data, thereby to determine generation of an abnormal electromagnetic wave in the housing and to determine a position where the abnormal electromagnetic wave is generated.

16. The method of monitoring electric rotating machinery according to claim 13, wherein the radiated photoelectrons coming through the monitoring window are split into photoelectron beams of different wavelengths, and the image data is compared with the reference image data with respect to at least one beam of a specific wavelength, thereby to calculate the temperature in the housing.

17. The method of monitoring electric rotating machinery according to claim 16, wherein the image data is compared with the reference image data with respect to at least two beams of specific wavelengths, thereby to calculate temperatures in the housing, and an average of the temperatures calculated is calculated.

18. The method of monitoring electric rotating machinery according to claim 13, further comprising:
   arranging a heated object in the housing and at a position to be heated and monitored through the monitoring window by the camera;
   heating the heated object intermittently;
   measuring the temperature of the heated object thus heated;
   comparing the wavelength distribution of the image data acquired when the heated object is heated, to evaporate a material sticking to the heated object, with the wavelength distribution of the reference image data, thereby to extract specific peak wavelengths; and
   determining the composition of the gas in the housing from the specific peak wavelengths.

19. The method of monitoring electric rotating machinery according to claim 18, wherein the concentration of a specific gas component in the housing is determined from the intensities of radiated photoelectron beams of the specific peak wavelengths of the image data.

* * * * *